United States Patent
Kucera et al.

(10) Patent No.: US 11,477,666 B2
(45) Date of Patent: Oct. 18, 2022

(54) METHODS AND SYSTEMS FOR NETWORK SELF-OPTIMIZATION USING DEEP LEARNING

(71) Applicant: University College Dublin National University of Ireland, Dublin, Dublin (IE)

(72) Inventors: Stepan Kucera, Dublin (IE); Holger Claussen, Dublin (IE); David Lynch, Belfield (IE); David Fagan, Belfield (IE); Michael Fenton, Belfield (IE); Michael O'Neill, Belfield (IE)

(73) Assignee: UNIVERSITY COLLEGE DUBLIN NATIONAL UNIVERSITY OF IRELAND, DUBLIN, Dublin (IE)

( * ) Notice: Subject to any disclaimer, the term of this patent is extended or adjusted under 35 U.S.C. 154(b) by 5 days.

(21) Appl. No.: 16/486,430

(22) PCT Filed: Feb. 15, 2018

(86) PCT No.: PCT/EP2018/053730
§ 371 (c)(1),
(2) Date: Aug. 15, 2019

(87) PCT Pub. No.: WO2018/149898
PCT Pub. Date: Aug. 23, 2018

(65) Prior Publication Data
US 2020/0015101 A1    Jan. 9, 2020

Related U.S. Application Data

(60) Provisional application No. 62/459,751, filed on Feb. 16, 2017.

(51) Int. Cl.
*H04L 12/26*    (2006.01)
*H04W 24/02*    (2009.01)
(Continued)

(52) U.S. Cl.
CPC .............. *H04W 24/02* (2013.01); *G06N 3/02* (2013.01); *H04W 24/06* (2013.01);
(Continued)

(58) Field of Classification Search
CPC ..................................................... H04W 52/54
See application file for complete search history.

(56) References Cited

U.S. PATENT DOCUMENTS

| | | | | |
|---|---|---|---|---|
| 8,229,999 B2 * | 7/2012 | Devarakonda | ........ | H04L 41/142 703/22 |
| 9,392,471 B1 * | 7/2016 | Thomas | ................ | H04W 16/32 |

(Continued)

FOREIGN PATENT DOCUMENTS

| | | |
|---|---|---|
| EP | 2683192 A1 | 1/2014 |
| WO | 2015/187071 A1 | 12/2015 |

OTHER PUBLICATIONS

Gu et al., "Recent Advanced in Convolutional Neural Networks", arXiv, Oct. 19, 2017, pp. 1-38.
(Continued)

*Primary Examiner* — Guang W Li
(74) *Attorney, Agent, or Firm* — Workman Nydegger (57) ABSTRACT

In one example embodiment, a method includes obtaining sets of input data and an objective, the sets of input data including values of wireless network communication parameters, generating sets of output data for the sets of input data in accordance with the objective, generating a mapping of the sets of input data to the sets of output data and training a network controller using the mapping.

14 Claims, 7 Drawing Sheets

(51) Int. Cl.
*G06N 3/02* (2006.01)
*H04W 24/06* (2009.01)
*H04W 28/02* (2009.01)
*H04W 52/54* (2009.01)
*H04W 72/04* (2009.01)
*H04W 72/12* (2009.01)

(52) U.S. Cl.
CPC ....... *H04W 28/0268* (2013.01); *H04W 52/54* (2013.01); *H04W 72/0446* (2013.01); *H04W 72/1231* (2013.01)

(56) References Cited

U.S. PATENT DOCUMENTS

| | | | | |
|---|---|---|---|---|
| 10,650,621 | B1* | 5/2020 | King | H04L 67/10 |
| 10,812,216 | B2* | 10/2020 | Black | H04B 7/0626 |
| 2012/0054131 | A1* | 3/2012 | Williamson | G06N 20/00 706/12 |
| 2014/0081895 | A1* | 3/2014 | Coenen | G06N 3/08 706/25 |
| 2014/0313908 | A1* | 10/2014 | da Silva | H04W 72/042 370/252 |
| 2015/0016387 | A1 | 1/2015 | Elmdahl et al. | |
| 2016/0099791 | A1* | 4/2016 | Cui | H04W 72/1278 370/329 |
| 2016/0300142 | A1* | 10/2016 | Feller | G06Q 10/06395 |
| 2018/0241843 | A1* | 8/2018 | Bardhan | G06F 9/5066 |
| 2019/0014487 | A1* | 1/2019 | Yang | G06N 3/084 |
| 2019/0312800 | A1* | 10/2019 | Schibler | H04L 41/082 |
| 2021/0367690 | A1* | 11/2021 | O'Shea | H04B 17/3912 |

OTHER PUBLICATIONS

Lynch et al., "Evolutionary Learning of Scheduling Heuristics for Heterogeneous Wireless Communications Networks", Proceedings of the 2016 Conference on Genetic and Evolutionary Computation (GECCO 2016), Jul. 20-24, 2016, pp. 949-956.

Schaul et al., "PyBrain", Journal of Machine Learning Research, vol. 11, Feb. 2010, pp. 743-746.

López-Pérez et al., "Duty Cycles and Load Balancing in HetNets with eICIC Almost Blank Subframes", IEEE 24th International Symposium on Personal, Indoor and Mobile Radio Communications (PIMRC Workshops), Sep. 8-9, 2013, pp. 173-178.

International Search Report and Written Opinion received for corresponding Patent Cooperation Treaty Application No. PCT/EP2018/053730, dated Oct. 30, 2018, 20 pages.

Office action received for corresponding European Patent Application No. 18705393.9, dated Sep. 3, 2020, 15 pages.

Li et al., "Artificial Neural Network Aided Dynamic Scheduling for eICIC in LTE HetNets", IEEE 17th International Workshop on Signal Processing Advances in Wireless Communications (SPAWC), 2016, 5 pages.

* cited by examiner

METHODS AND SYSTEMS FOR NETWORK SELF-OPTIMIZATION USING DEEP LEARNING

RELATED APPLICATION

This application was originally filed as Patent Cooperation Treaty Application No. PCT/EP2018/053730 filed Feb. 15, 2018 which claims priority benefit to United States Provisional Patent Application No. 62/459751, filed Feb. 16, 2017.

PRIORITY

This application claims priority to U.S. Provisional Application No. 62/455,751, filed Feb. 16, 2017, the entire contents of which are hereby incorporated by reference.

BACKGROUND

A Self-Organizing Network (SON) is an automation technology designed to make the planning, configuration, management, optimization and healing of mobile radio access networks simpler and faster.

SUMMARY

In at least one example embodiment, a method includes obtaining sets of input data and an objective, the sets of input data including values of wireless network communication parameters, generating sets of output data for the sets of input data in accordance with the objective, generating a mapping of the sets of input data to the sets of output data and training a network controller using the mapping.

In at least one example embodiment, the sets of input data include at least one of channel gains, measurements of received power, measurements of interference, power-related information, an available bandwidth, connectivity and user equipment (UE) and base station associations, quality of service (QoS) parameters, congestion and load information.

In at least one example embodiment, the objective is a QoS objective including at least one of targeted data rates, a latency, a reliability, a data loss rate, an out-of-order delivery and round-trip time.

In at least one example embodiment, the obtaining sets of input data includes obtaining the power-related information from a plurality of user equipments (UEs), the power-related information including a power-related value during almost blank subframes (ABS) and a power-related value during non-ABS subframes, the generating sets of output data generates the sets of output data based on the power-related information.

In at least one example embodiment, the sets of output data are optimized transmission schedules.

In at least one example embodiment, the generating sets of output data generates the sets of output data using at least one of genetic programming and a genetic algorithm.

In at least one example embodiment, the network controller is a neural network.

In at least one example embodiment, the training includes training individual networks to form a portion of the neural network, each individual network representing a function for an schedulable element of a downlink transmission schedule.

In at least one example embodiment, the training includes providing the sets of input data to each individual network to form a portion of the neural network, the sets of input data being signal strengths of a plurality of UEs in a plurality of subframes.

In at least one example embodiment, the training includes training individual networks to form a portion of the neural network, each individual network representing a different number of user equipments (UEs) in a communication system.

In at least one example embodiment, the training includes training individual networks, determining first layers of the individual networks, the first layers associated with a higher metric relative to other layers of the individual networks, and combining the first layers to form the neural network.

In at least one example embodiment, the method further includes deploying the network controller in a self-organizing network (SON) controller.

In at least one example embodiment, the method further includes collecting measurement data from a plurality of UEs in a communications network and generating, by the network controller, an optimized transmission schedule based on the measurement data.

At least one example embodiment provides a communication system including a trained network controller, the trained network controller including a memory storing computer-readable instructions, at least one processor configured to execute the computer-readable instructions to obtain input network measurements and generate output network parameters based on the input network measurements.

In at least one example embodiment, the input network measurements are at least one of channel gains, an available bandwidth, user equipment (UE) and base station associations, quality of service (QoS) parameters, congestion windows and base station load and power-related information.

In at least one example embodiment, the trained network controller is configured to execute the computer-readable instructions to optimize the output network parameters.

In at least one example embodiment, the trained network controller is a neural network.

At least one example embodiment provides a non-transitory computer-readable medium, when executed by a processor, configured to cause the processor to obtain sets of input data and an objective, the sets of input data including values of wireless network communication parameters, generate sets of output data for the sets of input data in accordance with the objective, generate a mapping of the sets of input data to the sets of output data and train a network controller using the mapping.

BRIEF DESCRIPTION OF THE DRAWINGS

Example embodiments will be more clearly understood from the following detailed description taken in conjunction with the accompanying drawings. FIGS. 1-6 represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), system on chip (SoC), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of storage medium. As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

As used herein, the term "macro cell" may be considered synonymous to, and may hereafter be occasionally referred to as a NodeB, an evolved NodeB (eNB), base station, transceiver station, base transceiver station (BTS), macro cell, etc., and describes a transceiver in communication with and providing wireless resources to users in a geographical coverage area.

As discussed herein, macro cells and small cells may have all functionally associated with conventional, well-known base stations in addition to the capability and functionality discussed herein.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network) and/or a WiFi network or WLAN.

Figure 1:
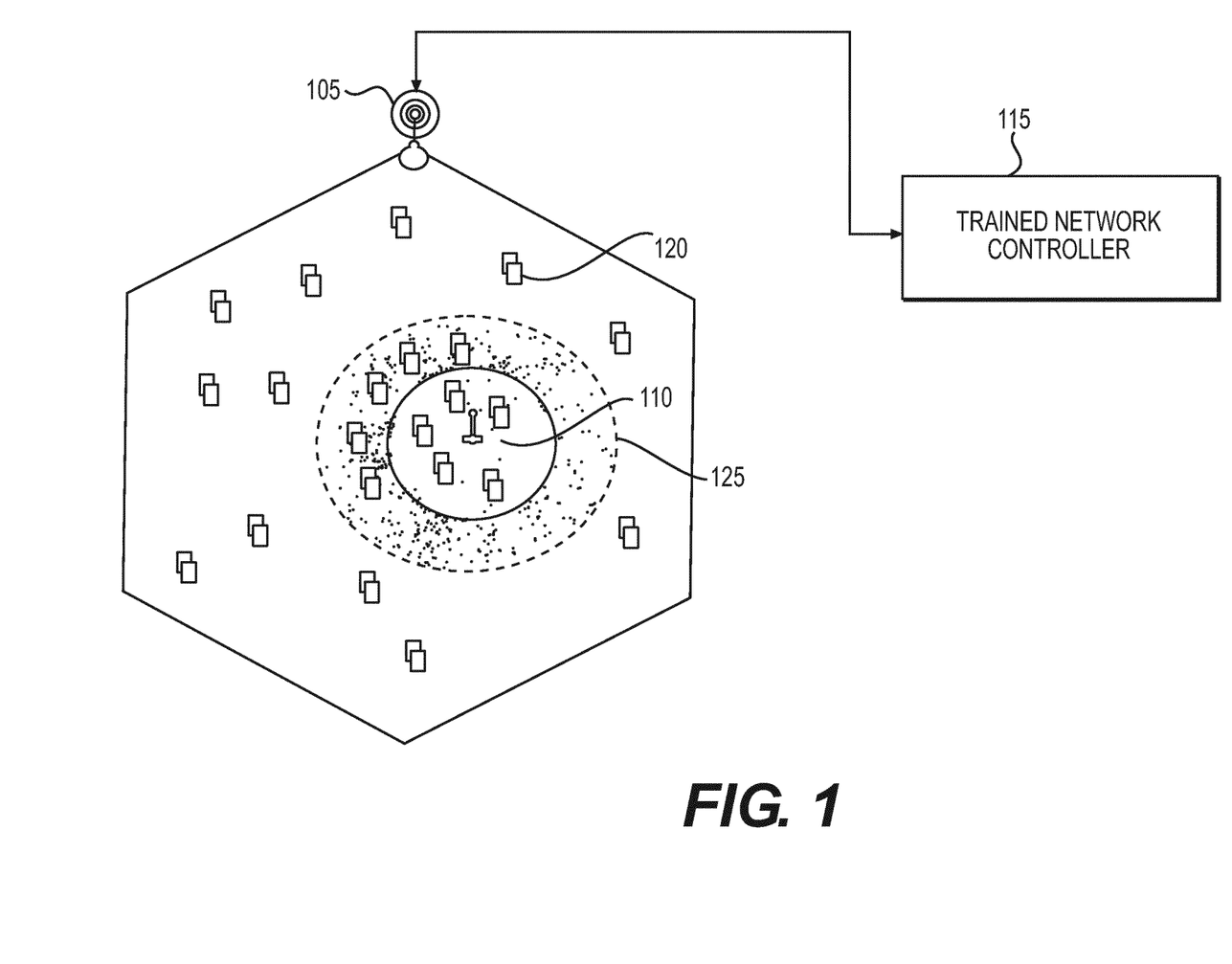
FIG. 1 illustrates a communication system, according to an example embodiment.

FIG. 1 illustrates a communication system, according to an example embodiment.

A communication system 100 is a heterogeneous network including a macro cell 105, a small cell 110 and a trained network controller 115. A coverage area of the small cell 110 is within a coverage area of the macro cell 105. The small cell 110 and the macro cell 105 communicate using known methods.

A plurality of user equipments (UEs) 120 communicate with at least one of the macro cell 105 and the small cell 110 based on a location of a particular UE 120. For example, the small cell (SC) 110 is a co-channel small cell that applies cell-selection bias in accordance to expand its coverage within the hosting macro cell (MC) 105.

An expanded region 125 of the SC 110 experiences stronger signal strength in the form of interference from the MC 105 than from the hosting SC 110. As such, any user equipment (UE) 120 that lies within the expanded region 125 will experience a Signal to Interference and Noise Ratio (SINR) of less than unity. Such high interference scenarios can lead to reduced downlink rates and dropped data packets, resulting in a decrease of quality of service to the UE.

Cells transmit data to attached UEs on a 1 millisecond time-frame, known as a subframe f. 40 subframes comprise a full frame F. To combat high interference at cell edges, an enhanced Inter Cell Interference Coordination (eICIC) mechanism known as "Almost Blank Subframes" (ABSs) has been proposed in the 3GPP Release 10. ABSs are subframes where MCs mute all transmissions (except for some used control signals such as an LTE physical broadcast channel (PBCH) and primary/secondary synchronization signals (PSS and SSS)), allowing SCs periods of low interference in which they can transmit data to cell-edge UEs. The ABS ratio (ABSr) defines the ratio of the number of ABSs to the full frame F. A MC m can implement any combination of eight (8) distinct ABS patterns, as listed in Table I. As such, there are only eight (8) discrete ABS ratios that can be implemented.

TABLE I

POSSIBLE ABS PATTERNS. 1 INDICATES MC TRANSMISSION AND 0 INDICATES AN ABS.

| | | | | | |
|---|---|---|---|---|---|
| ABS pattern 1 | 01111111 | 01111111 | 01111111 | 01111111 | 01111111 |
| ABS pattern 2 | 10111111 | 10111111 | 10111111 | 10111111 | 10111111 |
| ABS pattern 3 | 11011111 | 11011111 | 11011111 | 11011111 | 11011111 |
| ABS pattern 4 | 11101111 | 11101111 | 11101111 | 11101111 | 11101111 |
| ABS pattern 5 | 11110111 | 11110111 | 11110111 | 11110111 | 11110111 |
| ABS pattern 6 | 11111011 | 11111011 | 11111011 | 11111011 | 11111011 |
| ABS pattern 7 | 11111101 | 11111101 | 11111101 | 11111101 | 11111101 |
| ABS pattern 8 | 11111110 | 11111110 | 11111110 | 11111110 | 11111110 |

The trained network controller 115 plans, configures, manages, optimizes and heals a mobile radio access network. The trained network controller 115 may be a self-organizing network (SON) controller. Using SON, newly added base stations can be self-configured in line with a "plug-and-play" paradigm while all operational base stations will regularly self-optimize parameters and algorithmic behavior in response to observed network performance and radio conditions. Furthermore, self-healing mechanisms can be triggered to temporarily compensate for a detected equipment outage, while awaiting a more permanent solution.

The trained network controller 115 is built using deep learning. For example, the trained network controller 115 may be a neural network, but is not limited thereto.

Figure 2:
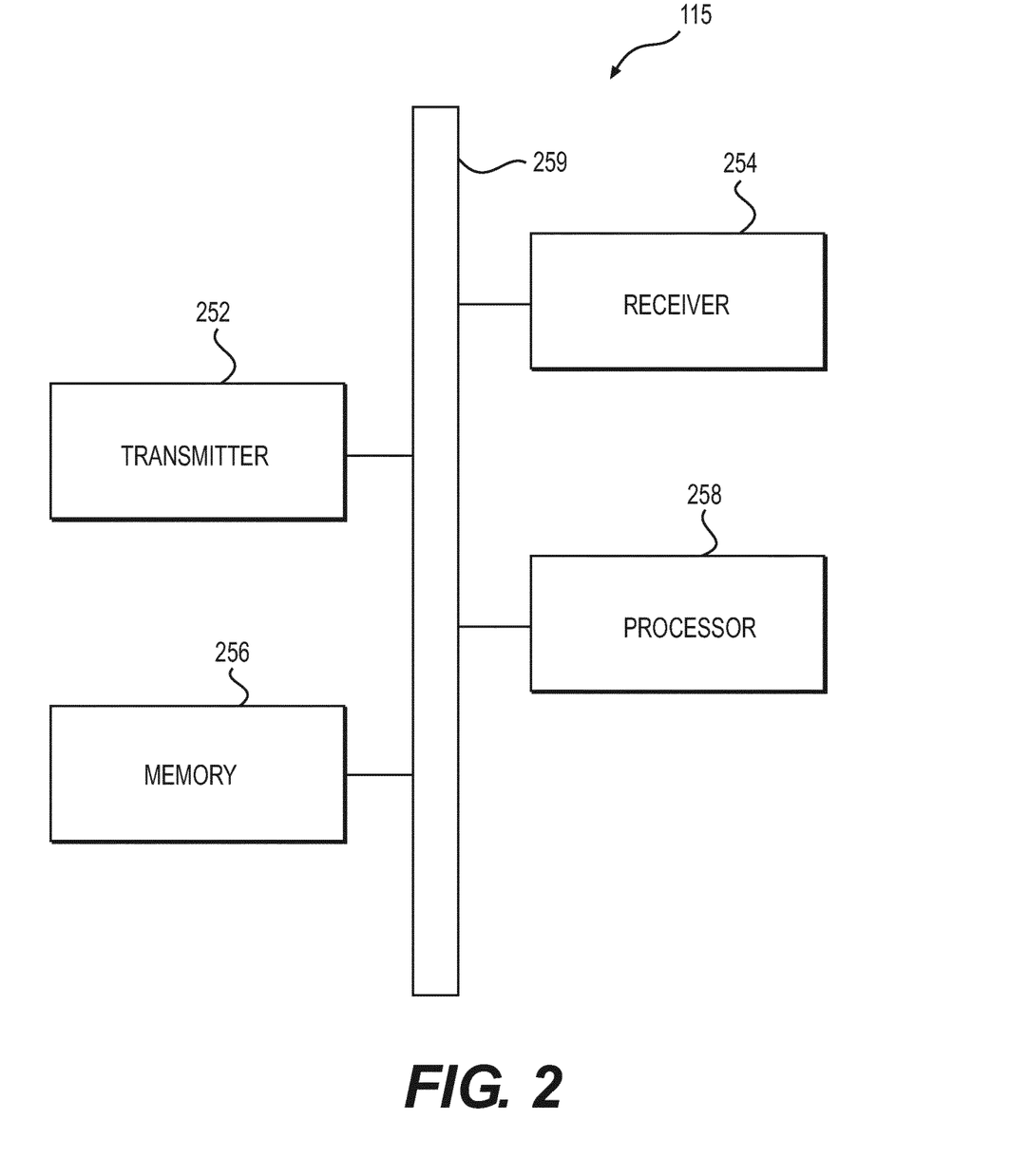
FIG. 2 is a diagram illustrating an example structure of a trained network controller.

FIG. 2 is a diagram illustrating an example structure of the trained network controller 115. Referring to FIG. 2, the trained network controller 115 may include, for example, a data bus 259, a transmitter 253, a receiver 254, a memory 256, and a processor 258.

The transmitter 253, receiver 254, memory 256, and processor 258 may send data to and/or receive data from one another using the data bus 259. While the transmitter 253 and the receiver 254 are illustrated as separate entities, it should be understood that the transmitter 253 and the receiver 254 may be combined to form a transceiver.

The transmitter 253 is a device that includes hardware and any necessary software for transmitting signals including, for example, control signals or data signals via one or more wired and/or wireless connections to other network element.

The receiver 254 is a device that includes hardware and any necessary software for receiving wireless signals including, for example, control signals or data signals via one or more wired and/or wireless connections to other network elements.

The memory 256 may be any device capable of storing data including magnetic storage, flash storage, etc.

The processor 258 may be any device capable of processing data including, for example, a processor structurally configured to carry out specific operations, or structurally configured to execute instructions included in computer readable code including, for example, code stored in the memory 256. Examples of the above-referenced processor include, but are not limited to, a microprocessor, a multi-processor, a central processing unit (CPU), a digital signal processor (DSP), system-on-chip (SoC) devices, an application-specific integrated circuit (ASIC), and a field programmable gate array (FPGA).

According to at least one example embodiment, any operations described herein as being performed by the trained network controller 115, may be performed by the trained network controller 115 shown in FIG. 2. For example, according to at least one example embodiment, the trained network controller 115 may be programmed, in terms of software and/or hardware, to perform any or all of the functions described herein as being performed by a network element.

Examples of the trained network controller 115 being programmed, in terms of software, to perform any or all of the functions described herein will now be discussed below. For example, the memory 256 may store a program including executable instructions corresponding to any or all of the operations described herein. According to at least one example embodiment, additionally or alternatively to being stored in the memory 256, the executable instructions may be stored in a computer-readable medium including, for example, an optical disc, flash drive, SD card, etc., and the trained network controller 115 may include hardware for reading data stored on the computer readable-medium. Further, the processor 258 may be a processor configured to perform any or all of the operations described herein by reading and executing the executable instructions stored in at least one of the memory 256 and a computer readable storage medium loaded into hardware included in the trained network controller 115 for reading computer-readable mediums.

Examples of the trained network controller 115 being programmed, in terms of hardware, to perform any or all of the functions described herein will now be discussed below. Additionally or alternatively to executable instructions corresponding to the functions described as being performed by the trained network controller 115 being stored in a memory or a computer-readable medium as is discussed above, the processor 258 may include a circuit that has a structural design dedicated to performing any or all of the operations described herein. For example, the above-referenced circuit included in the processor 258 may be a FPGA or ASIC physically programmed to perform any or all of the operations described herein.

In one example embodiment, the processor 258 executes instructions stored in the memory 256 to obtain input network measurements from the UEs 120 in the communication system (via the small cell 110 and the macro cell 105) and generate optimized output network parameters based on the input network measurements. The input network measurements are at least one of channel gains, an available bandwidth, user equipment (UE) and base station associations, quality of service (QoS) parameters, congestion windows and base station load and power-related information. The power-related information may include at least one of Signal to Interference and Noise Ratio (SINR) and received interference information.

Figure 3A:
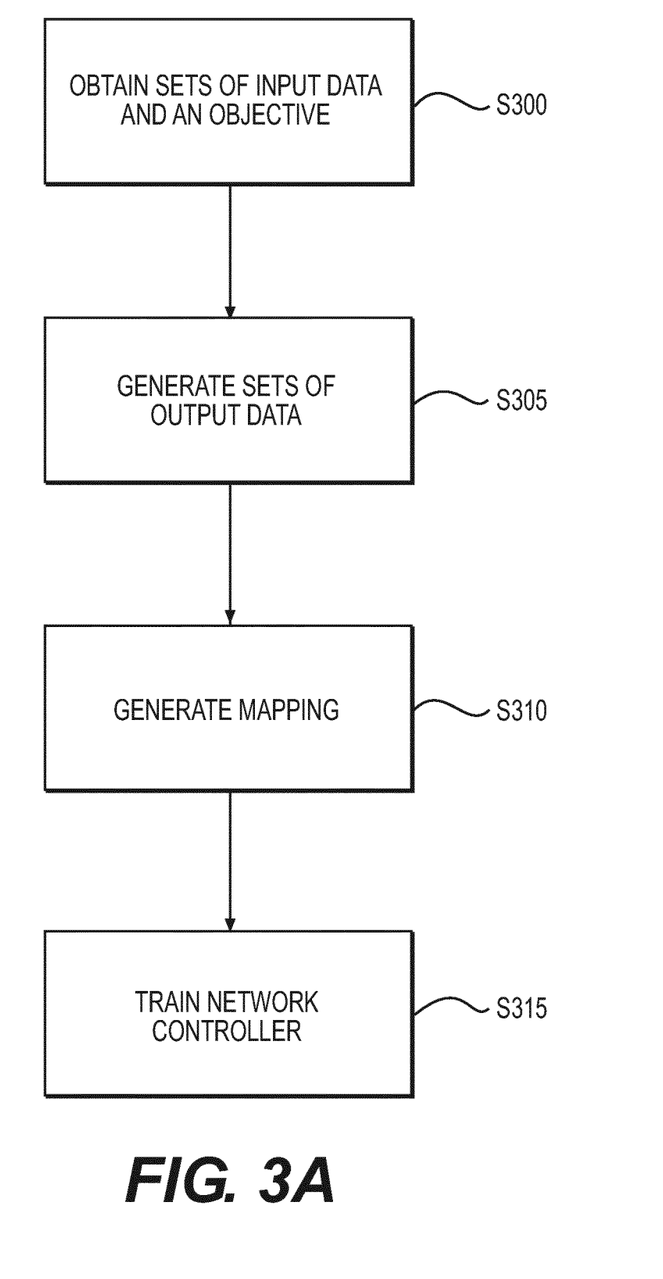
FIG. 3A illustrates a method according to an example embodiment.

FIG. 3A illustrates a method according to an example embodiment. The method of FIG. 3A may be performed by a trainer 350, shown in FIG. 3B.

Figure 3B:
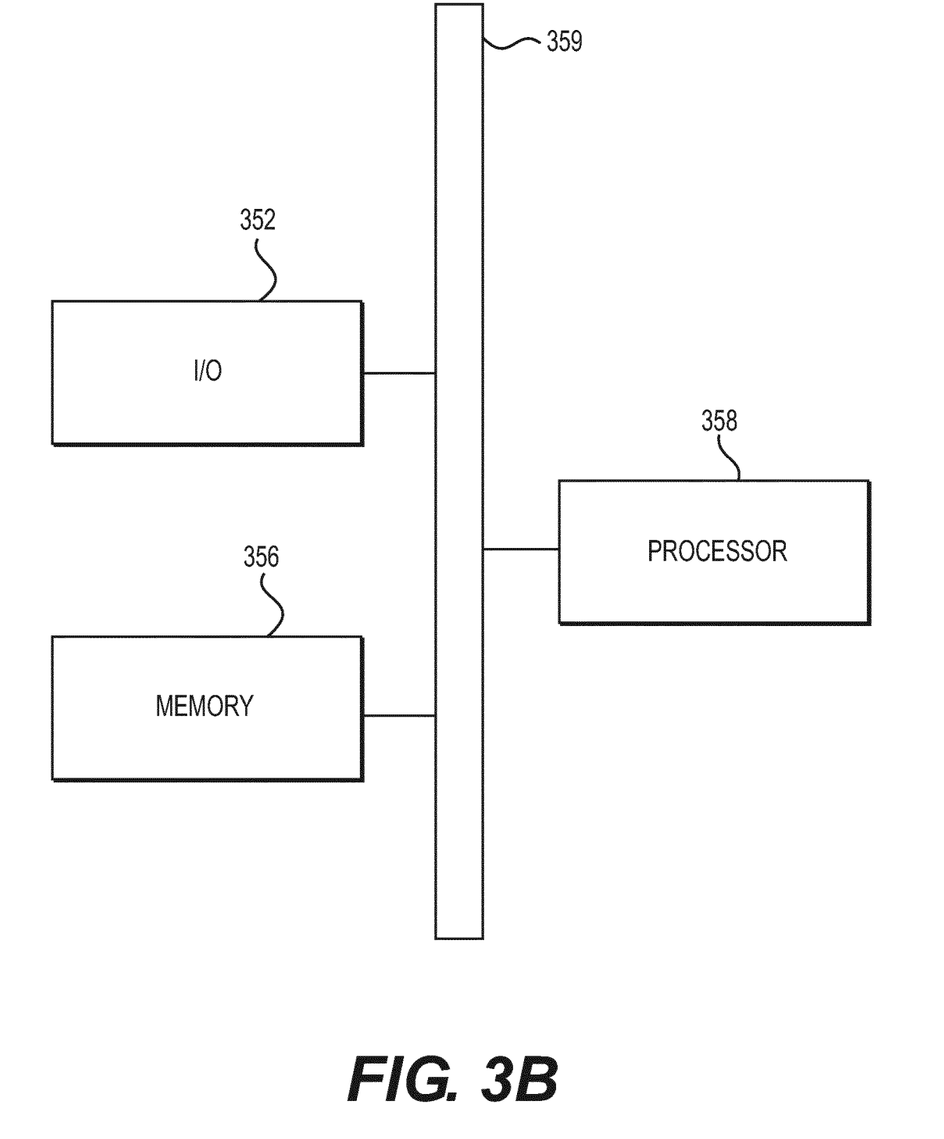
FIG. 3B illustrates a trainer according to an example embodiment.

The trainer 350 may include, for example, a data bus 359, an input/output (I/O) interface 353, a memory 356, and a processor 358. The I/O interface 353 may receive data (e.g., measurements from the UEs 120, the MC 110 and the SC 105) and output data (e.g., optimized network parameters). The processor 358 may perform the functions described with reference to FIG. 3A and functions described below by executing computer-readable instructions stored in the memory 356.

At S300, the trainer obtains sets of input data and an objective. The objective may be obtained from a network operator. The sets of input data include values of wireless network communication parameters.

At S305, the trainer generates sets of output data for the sets of input data in accordance with the objective.

At S310, the trainer generates a map of the sets of input data to the sets of output data.

At S315, the trainer trains the network controller using the mapping.

Further descriptions of the operations of FIG. 3A are provided below.

Figure 4:
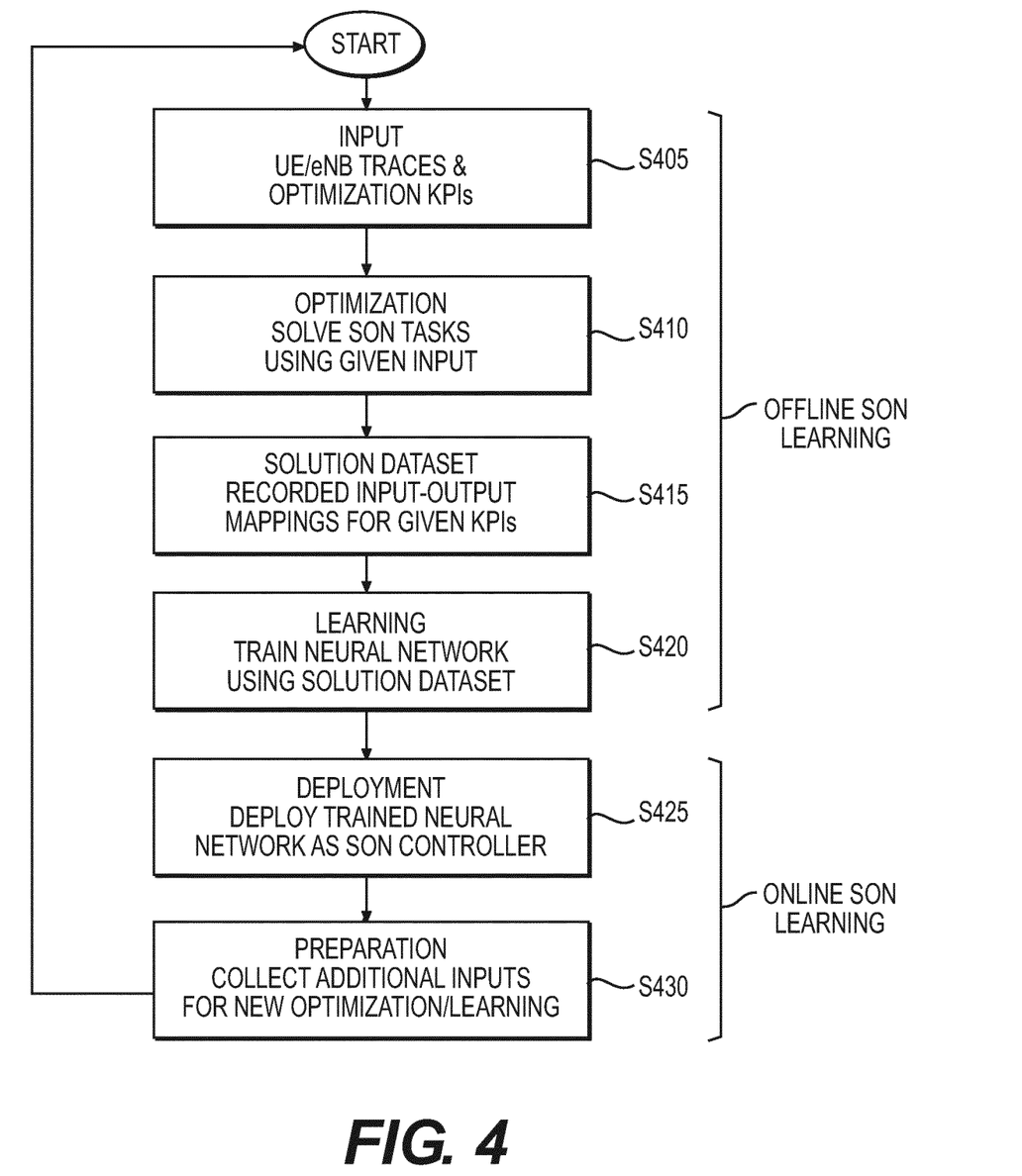
FIG. 4 illustrates an automated optimization and machine learning for a network controller (e.g., SON) according to an example embodiment.

For example, FIG. 4 illustrates an automated optimization and machine learning method for a network controller (e.g., SON) according to an example embodiment. As shown, the method of FIG. 4 includes an online portion and an offline portion. The method of FIG. 3A may be considered part of the offline portion.

According to example embodiments, high performance machine learning (ML) techniques (Genetic Algorithms, for example) are first used to generate offline input-output pairs for SON optimization (e.g., mappings of input network measurements and states onto desired optimization solutions (output data) for given optimization objectives). The mappings are used to drive offline learning in a deep neural network, allowing for the knowledge found through evolutionary search to be learned by the deep neural network. When deploying the trained neural network as a live SON decision maker, network optimization can be achieved even for unseen data and in a fraction of the time needed by the evolutionary optimizers to evolve a bespoke solution.

As shown in FIGS. 4, S405, S410, S415 and S420 are offline learning steps, which correspond to S300, S305, S310 and S315, respectively.

Offline machine-learning optimizers are first used to automatically generate the solution dataset of optimized human-competitive solutions to given SON optimization tasks.

At S405, user equipment measurements and base station traces such as UE channel gains and SINRs collected during network operation are acquired as input data at S405. At S410, the input data is used as input for optimization algorithms (e.g., Hill Climbers, Evolutionary Algorithms, Genetic Algorithms, Genetic Programming, Grammatical Evolution), to achieve optimization objectives (e.g., in the form of key performance indicators such as sum of data rate algorithms as required by network operator) at S410.

More specifically, the optimization uses fully accurate channel gains across a full frame of 40 subframes as initial inputs (S405). Two sets of data are collected for each UE: (1) full channel gain matrix and (2) corresponding reported estimated quantized averaged SINR values. The full channel gain matrix is used to generate the reported estimated SINR values which are then used as inputs in the optimization process (S410) to generate optimized output values (i.e. a binary schedule).

The optimized values are stored as input-output mappings for given key performance indicators at S415. More specifically, the optimized output values (also referred to as a solution dataset) are generated using the reported estimated SINR values. The optimized output values are mapped to the reported estimated SINR values used to generate the output values. The mapping is then used to train a neural network in S420.

More specifically, at S420, a machine-learning entity (e.g., a neural network such as a Deep Learning neural network), is trained, also offline, by using the generated solution dataset from S415 in order to extract the underlying model within the optimizer. The training may be done using conventional methods such as described in Jiuxiang Gu, et al., *Recent Advanced in Convolutional Neural Networks*, arXiv:1512.07108 (Jan. 5, 2017), the entire contents of which are hereby incorporated by reference.

As a result, a fast and well-performing SON decision-maker is obtained. Neural networks in both shallow and deep format can be used (e.g., Feed Forward Nets, Recurrent Nets, Convolution Nets, Restricted Boltzmann Machines) as well as a wide range of data representations (e.g., floats, level plot images).

At S425, the trained neural network is deployed as a SON controller to carry out online quality network optimization based on unseen input data. Unseen data are reported estimated SINR values (e.g., one estimated SINR value for ABS, one estimated SINR value for non-ABS) during live operation of the heterogeneous network, i.e., during operation of the SON controller. In other words, the unseen input data is the same type of data that is used as input data at S405 (i.e., full channel gain matrix and corresponding reported estimated quantized averaged SINR values).

As shown in FIG. 4, S405, S410, S415, S420, S425 and S420 can be sequentially iterated in an endless loop to iteratively improve the overall SON performance by repetitive learning.

In every iteration, the solution dataset is augmented by new previously unseen scenarios collected during the most recent SON operation, and then used as new training data to build a better-performing next-generation neural network that would subsequently replace the current neural network in the role of a SON controller.

Network Description

Example embodiments address a NP-hard (non-deterministic polynomial-time hard) problem of multi-user scheduling under pre-defined fairness and data rate constraints in heterogeneous LTE networks consisting of a macro cell (MC) tier and a small-cell (SC) tier. As shown in FIG. 1, co-channel small cells apply cell-selection bias in accordance with 3GPP LTE Release 10 (and beyond) to expand their coverage within the hosting macro cell.

The expanded region (e.g., 125) of a SC experiences stronger signal strength in the form of interference from the neighboring MC than from the hosting SC. As such, any user equipment (UE) that lie within the expanded region will experience a Signal to Interference and Noise Ratio (SINR) of less than unity. Such high interference scenarios can lead to reduced downlink rates and dropped data packets, resulting in an unacceptable quality of service for the UE.

Scheduling Optimization

A downlink rate for a UE u (e.g., the UE 120) attached to a cell i during a subframe f can be described by Shannon's equation for the transmission of wireless data in the presence of Additive white Gaussian (AWG) noise:

$$R_{u,i,f} = B/N_{i,f} * \log 2(1+SINR_{u,i,f}) \quad (1)$$

where B is the available bandwidth (e.g. 20 MHz), $N_{i,f}$ is the total number of UEs sharing that bandwidth during subframe f, and $SINR_{u,i,f}$ is the SINR of the UE u in subframe f.

To increase the downlink rate of a UE, base stations intelligently schedule UEs in order to minimize per-subframe bandwidth congestion while increasing (e.g., maximizing) achievable (average) SINR. Hosting cells schedule a full frame of data transmissions to attached UEs in advance of their transmission.

Since a full frame F is 40 ms long, the transmission schedules are computed within a 40 ms time-frame.

A baseline scheduling technique used by MCs is to schedule all attached UEs to receive data during every subframe. However, this maximizes per-subframe congestion, as the available bandwidth is shared among all scheduled UEs. Contrary to fixed MCs, SCs have much more freedom for operational modification, and are capable of more advanced operator-defined scheduling techniques.

As each MC m indicates its ABSr to nearby SCs, this allows the nearby SCs to take advantage of protected subframes offered by MCs implementing ABSs.

In general, both MC and SC schedules make decisions based on UE reports of specific statistics. As part of their standard operation, all SC UEs operating in a 4G LTE HetNet can be configured to constantly communicate two values to their serving cell: their average SINR performance during protected ABSs, and their average SINR performance during non-ABSs. The reported values are quantized to the order of 1-2 dB, and SINR values are capped at 30 dB as network hardware cannot take advantage of any values thereover. MC UEs only need to report the overall average SINR.

Examples

The following examples describe a full distributed solution for autonomous optimized SC scheduling. The problem of scheduling optimization in heterogeneous networks (HetNet) is NP-hard. An NP-hard problem is generally insolvable in polynomial time using conventional algorithms.

Global data gathering and centralized decision-making, typically required by conventional optimizer, is not possible since real-time extensive data exchange among cooperating base stations is difficult to achieve in real-world deployments.

According to the example embodiments, high performing ML methods, in this example employing evolutionary methods such as Genetic Algorithms, are used by the trainer to generate offline input-output pairs (also referred to as a "dataset") for SON optimization For example, the input is a randomly generated set of SINR values which is a random placement of UE's around a simulation. The input is then passed to an optimizer such as a genetic algorithm or hillclimber. The optimizer then optimizes a schedule, or output, for the input SINR values.

As described above with reference to FIG. 4, a complete input dataset comprises of two sets of matched data: (1) SINR values (generated from channel gain matrices or similar) and (2) corresponding reported estimated quantized averaged SINR values.

The optimisation technique (as described with reference to S405) uses the SINR values to generate highly optimal binary schedule outputs. Since the optimisation technique uses the relatively accurate SINR values to generate the target output dataset, the machine learning method (as described with reference to S420) is then able to learn a mapping from the corresponding reported estimated quantized averaged SINR values to the binary schedule output. The learned mapping then ensures good performance on unseen test data which is of a similar format to that used to train the ML algorithm. Hence, the input-output pairs are then used to drive the offline learning in a deep neural network used in the network controller 115.

This allows for the knowledge found through evolutionary search to be learned by the deep neural network, and be applied in a fraction of the time needed by the evolutionary optimizers to evolve a bespoke solution to unseen data in a live SON operation.

A. Data Representation

Given the discrete nature of UE SINR reports, the trainer may generate random data that follows the form of generic 4G LTE UE SINR reports. In order to model an arbitrary SC with $|A_s|$ attached UEs (where $A_s$ represents the set of all UEs attached to an SC s), the trainer may generate $|As|$ sets of two random integer SINR values of the range [0:2:30] dB. For each UE $u \in A_s$, the higher of the two randomly generated values represents their ABS performance, while the lower value represents their non-ABS performance (since all UEs experience higher SINR during ABSs due to reduced interference).

An arbitrary ABSr of the range [0.125:0.125:0.875] is selected to dictate the ratio of ABS SINR values to non-ABS SINRs (no MC can implement an ABSr of 0 (i.e. transmitting all the time) or 1 (i.e. muted all the time)).

One aspect of scheduling based on UE SINR reports is that while the reported SINR values may be averaged and quantized, the actual SINR values experienced by UEs in the field will not be. As such, it is also the "actual" SINR data for each UE∈$A_s$ is determined. While the estimated reported SINR data is used for scheduling purposes by the controller 115, the actual SINR data is used in the calculation of downlink rates by the controller 115, and thus can be used as a fitness measure for network performance.

In a model, actual SINR data is generated by the trainer by adding a float from the range [−1:+1] to both estimated ABS and non-ABS SINR values to simulate noise of the real world.

Table I, provided above, illustrates that ABS patterns form repeated blocks of 8 subframes. Thus, network SINR values will repeat every 8 subframes during the full frame F. The problem can therefore be simplified by the trainer/network controller by only examining the first 8 subframes, since any schedules generated for the first 8 subframes can be repeated 4-fold to complete the full frame of 40 subframes. A scheduling problem for a SC with $|A_s|$ attached UEs can therefore be viewed as a $|A_s|\times 8$ binary matrix.

B. Dataset

In an example embodiment, the trainer constructs the dataset using Evolutionary Computation methods. In an example embodiment, the trainer generates 500,000 random instances of UE data reports for an arbitrary SC with 20 attached UEs using system model parameters as described in D. Lynch, M. Fenton, S. Kucera, H. Claussen, and M. O'Neill, "Evolutionary Learning of Scheduling Heuristics for Heterogeneous Wireless Communications Networks," in GECCO '16: Proceedings of the 2016 on Genetic and Evolutionary Computation Conference. Denver, USA: ACM, 20-24 Jul. 2016, pp. 949-956, the entire contents of which is hereby incorporated by reference. The training instances can be generated using the procedure described above in the data representation section, or in a live setting by sampling UE reports from the network over time.

The UEs are sorted with respect to average SINR performance.

For each of the 500,000 random instances, the GA (Genetic Algorithm) approach outlined in D. Lynch, M. Fenton, S. Kucera, H. Claussen, and M. O'Neill, "Evolutionary Learning of Scheduling Heuristics for Heterogeneous Wireless Communications Networks," in GECCO '16: Proceedings of the 2016 on Genetic and Evolutionary Computation Conference. Denver, USA: ACM, 20-24 Jul. 2016, pp. 949-956, was applied by the trainer to determine a GA optimized schedule for the random instance. Optimized schedules are produced by the GA for later use in the supervised training of a scheduler. A GA is a population based optimization algorithm. Here, a population of schedules is evolved over many generations, using a canonical mutation and crossover operators to explore the space of possible schedules for a given case. The fitness of each hypothesis schedule is evaluated by computing downlink rates that would be received under the same schedule, and hence computing the sum log of downlink rates (the industry standard metric of fairness). After many generations, a single highly fit schedule is returned. While the GA can be used for offline optimization to produce an idealized schedule, the GA is too slow to cope with the millisecond timescale on which updated schedules are used in real time. Nonetheless, the idealized schedules computed offline serve as target semantics for the subsequent learning of a rapidly executable model, i.e., a neural network scheduler.

Since the scheduling problem can be described as a $|A_s|\times 8$ matrix (where $|A_s|$ represents the number of attached UEs to be scheduled), the problem can be represented by the trainer in a linear 160-bit input-output pair when $|A_s|=20$. Inputs are a 160-bit vector of estimated UE SINR reports, while outputs are a 160-bit binary schedule as generated by the GA based on those same inputs.

The dataset is then split by the trainer into two sections with 10,000 randomly selected training cases, and 490,000 test cases.

It should be understood that example embodiments are not limited thereto. The amount of data the trainer splits may be input and may be varied based on empirical data and/or an amount of time available to train the network. The amount can be varied depending on the time you have to train the networks.

C. Deep Learning

In another example embodiment, the trainer trains layered networks, each characterized by 160 inputs and one bit of the solution output. "Individual bit" refers to a representation of an actual resource element or resource blocks in an available signal bandwidth as defined in 3GPP. Thus, "individual bit" may also be referred to as a schedulable element where 1 indicates using the schedulable element and 0 indicates not using the schedulable element for a particular user. Then, for each output bit, ten networks were trained and the best performing one was selected. The 160 selected trained networks are then combined into a final network that outputs a usable 160-bit target schedule.

Each individual network is provided with all 160 inputs representing the reported signal strength of each UE (20 UEs) in each subframe.

Figure 5:
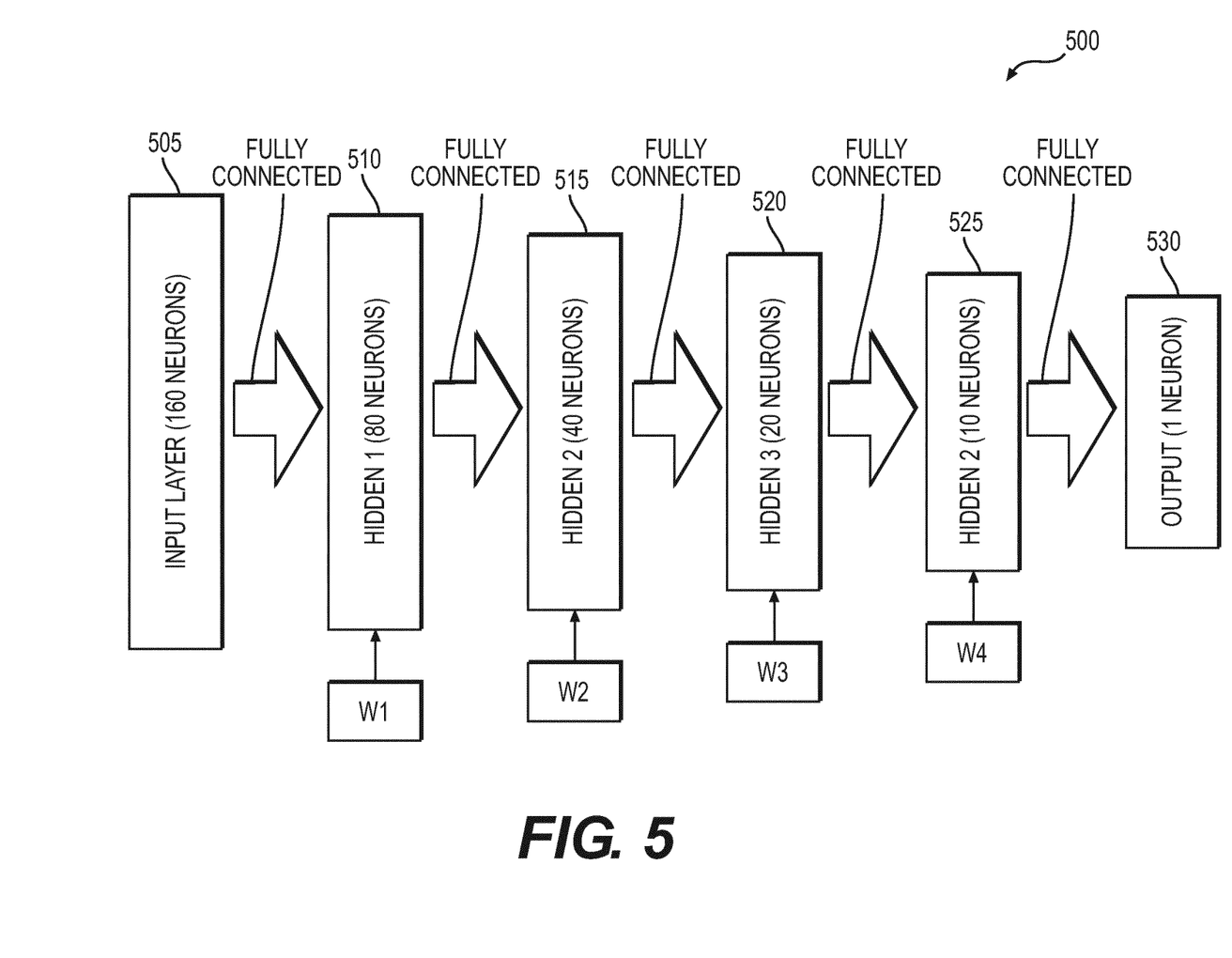
FIG. 5 illustrates a Feed Forward Neural Network (FFNN) according to an example embodiment.

A multi layered Feed Forward Neural Network (FFNN) is used by the trainer for each individual bit, as shown in FIG. 5. A FFNN 500 for an individual bit is trained via backpropagation with classification accuracy being used to drive the training. Networks were trained until convergence was achieved, and ten networks for each bit were trained to observe the general performance of the network approach. More specifically, each of the ten networks for each bit has a set of randomly initialized weights W1-W4. The weights W1-W4 are updated during training to provide the model its decisions to fire or not fire a neuron. As this process is randomly initialized, the ten networks were used show that the performance of the training was not being hindered by a poor starting point from the random initialed weights.

The weights W1-W4 are weights for the connections between layers of the FFNN. More specifically, the FFNN 500 includes an input layer 505, hidden layers 510, 515, 520 and 525 and an output layer 530 for outputting the individual bit. The layers 505, 510, 515, 520, 525 and 530 are serially arranged. The weights W1-W4 are weights for the hidden layers 510, 515, 520 and 525, respectively.

In a neural network, the signal being sent down the connection is multiplied by the weight and fed into the next neuron. The neuron activates if the sum of all these weight times input signals and greater than the threshold value of the activation function of the neuron.

Using the FFNN 500 matches the GA performance, but also allows for the possibility of the networks to uncover a better solution than the GA. This approach also allows for a larger training set to be used and results to be produced in a faster manner.

Figure 6:
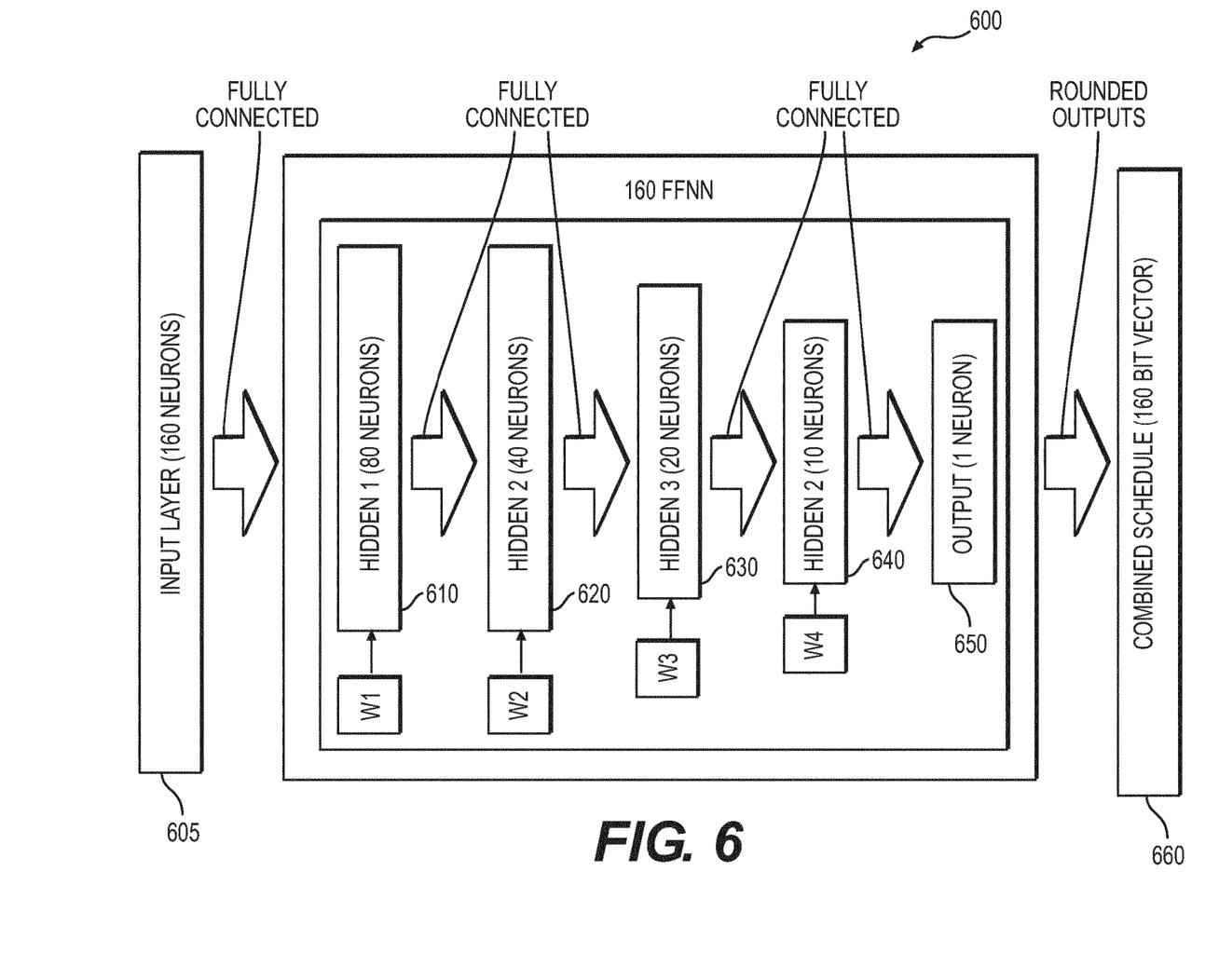
FIG. 6 illustrates a Deep Feed Forward Network (DFFN) scheduler according to an example embodiment.

Once training was completed for each FFNN (i.e., for each bit), the trainer selects the best network that exhibited the best performance on the 490 k unseen data points for each bit and combines the selected networks into a larger network, as seen in a Deep Feed Forward Network (DFFN) scheduler 600 of FIG. 6. The network scheduler 600 uses a common input layer 605 and also a final output layer 660 that combines the individual network outputs into a usable 160-bit schedule. The final output layer 660 rounds the output from each sigmoid output layer 650. Each individual network includes hidden sigmoid layers 610, 620, 630 and 640 having weights W1-W4, respectively. Each individual network also includes a sigmoid output 650 to output the corresponding individual bit. Each individual network of FIG. 6 may have the same structure as the FFNN illustrated in FIG. 5.

This approach also allows for the DFFN scheduler 600 to be trained or tuned as desired. More specifically, the DFFN scheduler 600 may be trained by the trainer by providing the DFFN scheduler 600 with additional/new input data and using desired measures such as bottom 5% performance improvement to adjust the weights of the large network to produce desired traits.

Setup

In an example embodiment, the setup described in T. Schaul, J. Bayer, D. Wierstra, Y. Sun, M. Felder, F. Sehnke, T. Rueckstieß, and J. Schmidhuber, "PyBrain," Journal of Machine Learning Research, vol. 11, pp. 743-746, 2010 (the entire contents of which are hereby incorporated by reference), a python-based neural networks library, is used.

FIG. 6 illustrates a Deep Feed Forward Network (DFFN) scheduler according to an example embodiment. More specifically, the trainer constructs the DFFN scheduler 600 as a combination of the 160 FFNN (i.e., 1 FFNN for each bit). The FFNNs are linked in the DFFN by the common input layer 605 and then a final output layer 660 is added to combine the outputs of the 160 networks into a binary vector of 160 size. For each of the 160 individual networks, the trainer uses a linear input layer (the common input layer 605) followed by the four hidden sigmoid layers 610, 620, 630 and 640, with the sigmoid output layer 650 to scale/round a single output neuron to a value between 0 and 1 that is provided to the final output layer 660. Each hidden sigmoid layer 610, 620, 630 and 640 also had a bias (the weights W1-W4) connected. The networks were trained by the trainer on 10,000 examples, with 20% of these reserved for classification test performance. The networks were trained until converged using back-propagation. In an example embodiment, the trainer uses a momentum rate of 0.01.

Performance Evaluation

In order to promote fairness, upper-percentile UE performance can be adjusted for relatively smaller gains in low-percentile performance. This may be achieved by summing a logarithm of UE downlink rates (Sum-Log-Rates (SLR)) to obtain a measure of network performance. The logarithm allows changes to lower-percentile values to be magnified, but changes to upper-percentile values have a relatively smaller effect on the overall SLR amount. Maximization of the SLR leads to maximization of network fairness; which is a fitness function used when evolving GA schedules.

In an example embodiment, four benchmarks are used to judge the performance of the neural network (NN) approach to scheduling:
  1) GA: the evolved solutions as described above,
  2) NN: the neural network trained based on evolved solutions of D. Lynch, M. Fenton, S. Kucera, H. Claussen, and M. O'Neill, "Evolutionary Learning of Scheduling Heuristics for Heterogeneous Wireless Communications Networks," in GECCO '16: Proceedings of the 2016 on Genetic and Evolutionary Computation Conference. Denver, USA: ACM, 20-24 Jul. 2016, pp. 949-956,
  3) The benchmark approach of D. Lopez-Perez and H. Claussen, "Duty Cycles and Load Balancing in HetNets with eICIC Almost Blank Subframes," in 24th International Symposium on Personal, Indoor and Mobile Radio Communications (IEEE PIMRC Workshops). IEEE, 2013, pp. 173-178 (the entire contents of which are hereby incorporated by reference),
  4) Baseline: The baseline approach is the schedule all users in every subframe, and
  5) Random: The random approach generates a random binary string to set UE schedules.

All results are normalized with the GA performance representing the upper bounds and the baseline performance representing the lower bounds of the range.

A. General Performance

Having been trained by the trainer on 10,000 initial cases, all individual networks of the trained network controller are tested on 490,000 unseen test cases. Table II shows the average performance of the approaches on this test data. The first column shows the average performance expressed as a percentage of the GA's performance. The second column shows the performance once the data has been normalized between the baseline and GA models, indicating a distinction between the DFFN according to example embodiments and the human-designed state-of-the-art benchmark.

TABLE II

Average performance on 490,000 test cases

| Approach | Average Performance [logarithmic scale] | Normalized Average Performance [linear scale] |
|---|---|---|
| GA | 100% | 100% |
| DFFN | 99.626% | 49.86% |
| Benchmark | 99.270% | 2.14% |
| Baseline | 99.254% | 0% |
| Random | 97.214% | −273.46% |

B. Gains and Drop-Offs

A first column of Table III (provided below) shows a number of times each approach outperformed the GA. The NN approach outperformed the GA on over half of the 490,000 unseen test cases. A second column of Table III shows an average gain in performance for those successful cases.

The third column of Table III shows a number of times the GA was better than each approach, with the fourth column displaying an average loss with respect to those dis-improvements.

All these percentages are expressed in terms of loss or gain relative to the GA performance on each case. The NN again comes out on top in terms of most successes and least failures when compared to the other methods.

TABLE III

AVERAGE PERFORMANCE ON 490,000 TEST CASES

| Approach | >GA | Avg. Gain | <GA | Avg Drop-Off |
|---|---|---|---|---|
| NN | 245,111 | 0.12% | 244,889 | 0.87% |
| Benchmark | 52,267 | 0.13% | 437,733 | 0.83% |
| Baseline | 11,190 | 3.37% | 478,810 | 0.84% |
| Random | 5,335 | 2.84% | 484,665 | 2.85% |

C. Time Constraints

The problem with the GA approach is that while it delivers a better schedule it does not provide the schedule in a timely manner. In general, runs take upwards of 5 seconds but the available time between needed schedules is 40 ms. In order for the NN approach to be feasible this time constraint needs to be met. The current NN approach according to example embodiments is able to activate the network and receive a solution in under 40 ms, as seen in Table IV.

These times are just an indicator of the performance level achievable. The approach used is implemented in Python and does not utilize any form of GPU acceleration, multi core evaluation, or compilation to a C++ implementation. With these improvements, the numbers in Table IV can be significantly reduced, even by order of magnitude.

TABLE IV

AVERAGE SCHEDULE GENERATION PERFORMANCE

| Time | Schedule Generation Time |
|---|---|
| Average | 38.11 ms |
| Maximum | 38.28 ms |
| Minimum | 37.98 ms |

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. An automated optimization and machine-learning method for a network controller of a heterogeneous network, comprising:
obtaining sets of input data and an objective, the sets of input data including values of wireless network communication parameters comprising at least one of channel gains, measurements of received power, measurements of interference, power-related information, an available bandwidth, connectivity, user equipment (UE) and base station associations, quality of service (QoS) parameters, congestion and load information;
generating sets of output data for the sets of input data in accordance with the objective;
generating a mapping of the sets of input data to the sets of output data; and
training a network controller using the mapping;
wherein the network controller comprises a neural network configured to extract an underlying model describing the mapping, the neural network comprising a plurality of individual Feed-Forward neural networks each of which is trained on the set of input data and one individual bit of the output data, wherein said individual bit is a schedulable element representing an actual resource element in an available signal bandwidth.

2. The method of claim 1, wherein the objective is a QoS objective including at least one of targeted data rates, a latency, a reliability, a data loss rate, an out-of-order delivery and round-trip time.

3. The method of claim 1, wherein the obtaining sets of input data includes, obtaining the power-related information from a plurality of user equipments (UEs), the power-related information including a power-related value during almost blank subframes (ABS) and a power-related value during non-ABS subframes, the generating sets of output data generates the sets of output data based on the power-related information.

4. The method of claim 3, wherein the sets of output data are optimized transmission schedules.

5. The method of claim 1, wherein the generating sets of output data generates the sets of output data using at least one of genetic programming and a genetic algorithm.

6. The method of claim 1, wherein each individual Feed-Forward neural network provides a schedulable element of a downlink transmission schedule.

7. The method of claim 6, wherein the training includes, providing the sets of input data to each individual Feed-Forward neural network.

8. The method of claim 1, wherein each individual Feed-Forward neural network represents a different number of user equipments (UEs) in a communication system.

9. The method of claim 1, wherein the training includes, training individual networks, determining first layers of the individual Feed-Forward neural networks, the first layers associated with a higher metric relative to other layers of the individual networks, and combining the first layers to form the neural network.

10. The method of claim 1, further comprising: deploying the network controller in a self-organizing network (SON) controller.

11. The method of claim 1, further comprising: collecting measurement data from a plurality of UEs in a communications network; and generating, by the network controller, an optimized transmission schedule based on the measurement data.

12. A communication system comprising:
a trained network controller of a heterogeneous network, the trained network controller including, a memory storing computer-readable instructions, at least one processor configured to execute the computer-readable instructions to,
obtain input network measurements comprising at least one of channel gains, measurements of received power, measurements of interference, power-related information, an available bandwidth, connectivity, user equipment (UE) and base station associations, quality of service (QoS) parameters, congestion and load information, and
generate output network parameters based on the input network measurements; wherein the network controller comprises a Deep Feed Forward neural network comprising a plurality of individual Feed-Forward neural networks each of which receives the input network measurements and outputs an individual bit of output data, wherein said individual bit is a schedulable element representing an actual resource element in an available signal bandwidth.

13. The communication system of claim 12, wherein the trained network controller is configured to execute the computer-readable instructions to optimize the output network parameters.

14. A non-transitory computer-readable medium carrying instructions which, when executed by a processor, cause the processor to,
obtain sets of input data and an objective, the sets of input data including values of wireless network communication parameters comprising at least one of channel gains, measurements of received power, measurements of interference, power-related information, an available bandwidth, connectivity, user equipment (UE) and base station associations, quality of service (QoS) parameters, congestion and load information;
generate sets of output data for the sets of input data in accordance with the objective;
generate a mapping of the sets of input data to the sets of output data; and
train a network controller using the mapping;
wherein the network controller comprises a neural network configured to extract an underlying model describing the mapping, the neural network comprising a plurality of individual Feed-Forward neural networks each of which is trained on the set of input data and one individual bit of the output data, wherein said individual bit is a schedulable element representing an actual resource element in an available signal bandwidth.

* * * * *